United States Patent
Xia et al.

(10) Patent No.: US 8,908,662 B2
(45) Date of Patent: Dec. 9, 2014

(54) APPARATUS AND METHOD OF FLOW MOVEMENT FOR NETWORK-BASED MOBILITY MANAGEMENT PROTOCOL

(75) Inventors: Yangsong Xia, Richardson, TX (US); Behcet Sarikaya, Wylie, TX (US); John Kaippallimalil, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 580 days.

(21) Appl. No.: 12/702,087

(22) Filed: Feb. 8, 2010

(65) Prior Publication Data

US 2010/0202427 A1 Aug. 12, 2010

Related U.S. Application Data

(60) Provisional application No. 61/151,785, filed on Feb. 11, 2009.

(51) Int. Cl.
 *H04W 4/00* (2009.01)
 *H04W 36/12* (2009.01)
 *H04W 8/08* (2009.01)
 *H04W 36/00* (2009.01)
 *H04W 80/04* (2009.01)

(52) U.S. Cl.
 CPC .............. *H04W 36/12* (2013.01); *H04W 8/08* (2013.01); *H04W 36/0011* (2013.01); *H04W 80/04* (2013.01)
 USPC ........................................................ 370/338

(58) Field of Classification Search
 None
 See application file for complete search history.

(56) References Cited

U.S. PATENT DOCUMENTS

| 2004/0090941 | A1 | 5/2004 | Faccin et al. | |
| 2007/0268919 | A1* | 11/2007 | Sarikaya et al. | 370/401 |
| 2008/0137615 | A1* | 6/2008 | Park et al. | 370/332 |
| 2009/0094693 | A1* | 4/2009 | Patil | 726/12 |
| 2010/0315973 | A1* | 12/2010 | Hirano et al. | 370/254 |
| 2011/0164599 | A1* | 7/2011 | Sarikaya et al. | 370/338 |
| 2011/0183695 | A1* | 7/2011 | Sarikaya et al. | 455/507 |

FOREIGN PATENT DOCUMENTS

| CN | 101001442 A | 7/2007 |
| KR | 20070061296 A | 6/2007 |
| KR | 100848456 B1 | 7/2008 |

OTHER PUBLICATIONS

Bradner, S., "Key Words for Use in RFCs to Indicate Requirement Levels," BCP 14, RFC 2119, Mar. 1997.
Gundavelli, S., et al., "Proxy Mobile IPv6," RFC 5213, Aug. 2008.
Johnson, D., et al., "Mobility Support in IPv6," RFC 3775, Jun. 2004.

(Continued)

*Primary Examiner* — Kouroush Mohebbi
(74) *Attorney, Agent, or Firm* — Conley Rose, P.C.; Grant Rodolph; Brandt D. Howell (57) ABSTRACT

An apparatus comprising a local mobility anchor (LMA) configured to forward a flow to a mobile node (MN) via a first mobile access gateway (MAG) in a first network and via a second MAG in a second network, and to bind the flow to the second MAG from the first MAG, wherein the first MAG is configured to manage the MN mobility in the first network and the second MAG is configured to manage the MN mobility in the second network, wherein the first MAG sends a binding update comprising a flow description information to the LMA, and wherein the LMA replies to the binding update with a binding acknowledgement.

19 Claims, 4 Drawing Sheets

(56) References Cited

OTHER PUBLICATIONS

Thomson, S., et al., "IPv6 Stateless Address Autoconfiguration," RFC 4862, Sep. 2007.
Postel., J., "Internet Control Message Protocol," STD 5, RFC 792, Sep. 1981.
Conta A., et al., "Internet Control Message Protocol (ICMPv6) for the Internet Protocol Version 6 (IPv6) Specification," RFC 4443, Mar. 2006.
Soliman, H., et al., "Flow Bindings in Mobile IPv6 and Nemo Basic Support," draft-ietf-mext-flow-binding-04, Nov. 9, 2009.
Haley, B., et al., "Mobile IPv6 Generic Signaling Message," draft-ietf-mext-generic-signaling-message-00, Aug. 2008.
Soliman, H., et al., "Flow Bindings in Mobile IPv6 and Nemo Basic Support," draft-ietf-mext-flow-binding-00, May 16, 2008.
Sarikaya, B., "PMIPv6 Multihoming Support for Flow Mobility," draft-sarikaya-netext-fb-support-extensions-00.txt, Feb. 1, 2010, 10 pages.
Wakikawa, R., Ed., et al., "Multiple Care-of Addresses Registration," draft-ietf-monami6-multiplecoa-11.txt, Jan. 13, 2009, 45 pages.
Wakikawa, R., Ed., et al., "Multiple Care-of Addresses Registration," RFC 5648, Oct. 2009, 37 pages.
Muhanna, A., et al., "Binding Revocation for IPv6 Mobility," draft-ietf-mext-binding-revocation-03.txt, Jan. 29, 2009, 36 pages.
Muhanna, A., et al., "Binding Revocation for IPv6 Mobility," draft-ietf-mext-binding-revocation-14.txt, Oct. 26, 2009, 41 pages.
Soliman, H., et al., "Flow Bindings in Mobile IPv6 and Nemo Basic Support," draft-ietf-mext-flow-binding-00.txt, May 16, 2008, 33 pages.
Soliman, H., et al., "Flow Bindings in Mobile IPv6 and Nemo Basic Support," draft-ietf-mext-flow-binding-04.txt, Nov. 9, 2009, 38 pages.
Yokota, H., et al., "Inter-Technology Handoff Support in Mobile Node for Proxy Mobile IPv6," draft-yokota-netlmm-pmipv6-mn-itho-support-00.txt, Aug. 22, 2008, 14 pages.
Yokota, H., et al., "Inter-Technology Handoff Support in Mobile Node for Proxy Mobile IPv6," draft-yokota-netlmm-pmipv6-mn-itho-support-02.txt, Oct. 26, 2009, 15 pages.
Tsirtsis, T., et al., "Traffic Selectors for Flow Bindings," draft-ietf-mext-binary-ts-02.txt, Dec. 16, 2009, 19 pages.
Gundavelli, S., et al., "Proxy Mobile IPv6," draft-ietf-netlmm-proxymip6-18.txt, May 30, 2008, 92 pages.
Foreign Communication From a Related Counterpart Application, PCT Application PCT/CN2010/070659, International Search Report dated May 13, 2010, 5 pages.
Foreign Communication From a Related Counterpart Application, PCT Application PCT/CN2010/070659, Written Opinion dated May 13, 2010, 9 pages.
Devarapalli, V., "Mobile IPv6 Operation with IKEv2 and the Revised IPsec Architecture," RFC 4877, Apr. 2007, 27 pages.

* cited by examiner

APPARATUS AND METHOD OF FLOW MOVEMENT FOR NETWORK-BASED MOBILITY MANAGEMENT PROTOCOL

CROSS-REFERENCE TO RELATED APPLICATIONS

The present application claims priority to U.S. Provisional Patent Application No. 61/151,785 filed Feb. 11, 2009 by Yangsong Xia et al. and entitled "Flow Binding in Proxy Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WiFi) based on IEEE 802.11 standard, and Worldwide Interoperability for Microwave Access (WiMAX) based on IEEE 802.16 standard. However, specific mechanisms for IPv6 to meet some technology requirements have not yet been developed. For example, no specific mechanism is yet established for dynamically binding IPv6 flows in access networks for multiple-radio mobile devices. Flow binding comprises redirecting the flows for a mobile device between access networks during the relocation of the mobile device. A proxy mobile IPv6 protocol allows a mobile node to avoid handling its own mobility management. Instead, the mobility management of the mobile device can be handled by a mobile access gateway (MAG) and/or local mobility anchor (LMA), e.g. in the access network. The MAG and/or LMA may require a defined mechanism to handle flow binding for proxy mobile IPv6.

SUMMARY

In one embodiment, the disclosure includes an apparatus comprising a LMA configured to forward a flow to a mobile node (MN) via a first MAG in a first network and via a second MAG in a second network, and to bind the flow to the second MAG from the first MAG, wherein the first MAG is configured to manage the MN mobility in the first network and the second MAG is configured to manage the MN mobility in the second network, wherein the first MAG sends a binding update comprising a flow description information to the LMA, and wherein the LMA replies to the binding update with a binding acknowledgement.

In another embodiment, the disclosure includes a network component comprising detecting a new attachment between a MN and a first MAG, notifying a second MAG that has a previously established attachment with the MN about the new attachment between the MN and the first MAG, and binding a flow to the new attachment from the previously established attachment.

In yet another embodiment, the disclosure includes a method comprising receiving a binding update for an IP flow that is forwarded to a MN over a first interface associated with a first node in a first access network, wherein the IP flow comprises a plurality of packets that are associated with a first address associated with the first node, and wherein the first address is used to deliver the packets to the MN via the first node, and redirecting the IP flow to a second interface associated with a second node in a second access network, wherein redirecting the IP flow comprises encapsulating the packets with an outer header that comprises a second address associated with the second node, wherein the second address is used to deliver the packets to the MN via the second node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for enabling flow binding in proxy mobile IPv6. Flow binding may comprise redirecting a flow that may be initially received via a first access network to a second access network. Flow binding may be enabled when a mobile device, which may have a first active interface with the first access network, may establish a second active interface with the second access network to receive the flow. As such, the flow may be bound or redirected to a second link in the second access network instead of the first access network. The service may be an IPv6 service and may be provided by a service provider network via a LMA, which may be coupled to the first access network and the second access network. The IPv6 flow for the mobile device may be bound to the second access network by exchanging communications between a serving MAG (SMAG) in the first access network and a target MAG (TMAG) in the second access network. The SMAG and the TMAG may exchange proxy mobile messages with the LMA to establish flow binding from the first access network to the second access network or from the second access network back to the first access network.

Figure 1:
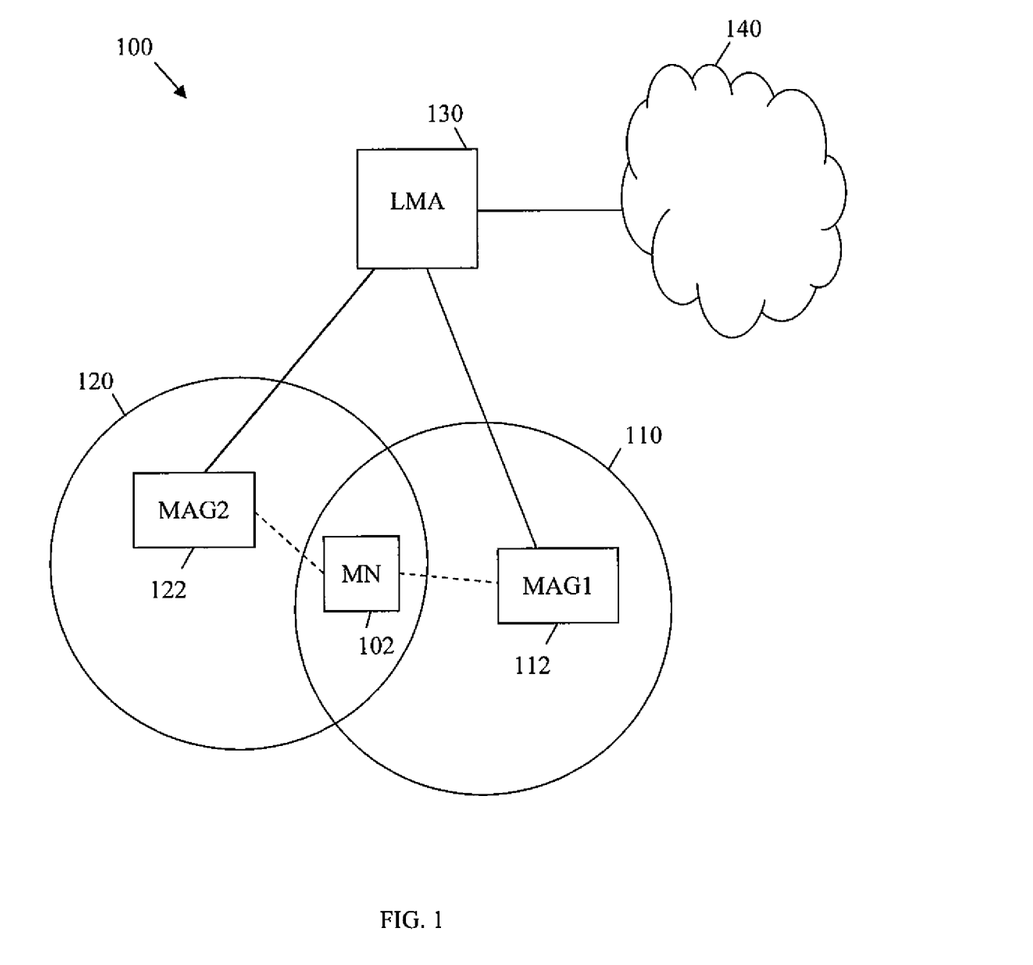
FIG. 1 is a schematic diagram of one embodiment of a wireless access network system.

FIG. 1 illustrates an embodiment of a wireless access network system 100, which may support flow binding in proxy mobile IPv6. The wireless access network system 100 may comprise a MN 102, a first MAG 112 (MAG1) in a first wireless access network 110, a second MAG 122 (MAG2) in a second wireless access network 120, a LMA 130, and a service provider network 140. The first wireless network 110 and the second wireless network 120 may independently establish connections and communicate with the service provider network 140 directly or via the LMA 130. For example, the first wireless access network 110 may be a third Generation Partnership Project (3GPP) network and the second wireless network 120 may be an IEEE 802.11 Wireless Local Area Network (WLAN), also referred to as WiFi network. The MN 102 may be located in the first wireless network 110 and/or the second wireless network 120, e.g. within the coverage range of the network(s), and thus may communicate with the service provider network 140. It will be appreciated that FIG. 1 illustrates only one embodiment of the wireless access network system 100. In alternative embodiments, the MN 102 may be located in any of a plurality of different wireless networks, which may support proxy mobile IPv6. Proxy mobile IPv6 is described in the Internet Engineering Task Force (IETF) Request for Comments (RFC) 5213, which is incorporated herein by reference as if reproduced in its entirety. Each network may comprise a corresponding MAG, which may be coupled to the LMA 130. The MN 102 may access any of the wireless networks to communicate with the service provider network 140 or other networks (not shown).

In an embodiment, the MN 102 may be any mobile device that uses the first MAG 112, the second MAG 122, and/or the LMA 130 to access the server provider network 140 or other network(s). Specifically, the MN 102 may be a mobile user-oriented device that communicates with the service provider network 140, e.g. via the first access wireless network 110 and/or the second wireless access network 120. For example, the MN 102 may be a cellular telephone, a notebook computer, a personal digital assistant (PDA), or any other wireless device. Alternatively, the MN 102 may be a fixed communications device, such as a desktop computer or set top box, which may be connected to the first MAG 112, the second MAG 122, and/or the LMA 130 using wireless technology.

In an embodiment, the first MAG 112 and the second MAG 122 may be any devices or components configured to handle mobility management for the MN 102, e.g. based on the proxy mobile IPv6 protocol. Mobility management may comprise binding flows, such as IPv6 flows, to any wireless access network where the MN 102 may establish an active interface. The flows may correspond to services provided to the MN 102 by the service provider network 140 and/or other external networks. For instance, the first MAG 112 and/or the second MAG 122 may bind a flow between the MN 102 and the service provider network 140, without affecting other flows and using the same home address associated with the MN 102. In a specific embodiment, the first MAG 112 and the second MAG 122 may exchange proxy mobile update (PBU) and proxy mobile acknowledgement (PBA) messages with the LMA 130 to bind or redirect flows between the first wireless access network 110 and the second wireless access network 120, as described below. Each of the first MAG 112 and the second MAG 122 may forward the services bound in its corresponding network from the provider to the MN 102.

In an embodiment, the LMA 130 may be any device or component that provides connectivity and/or external access to the MN 102 via the first wireless network 110 and/or the second wireless network 120. The LMA 130 may be configured to support the proxy mobile IPv6 protocol to enable mobility for the MN 102. The LMA 130 may also forward one or more flows to the MN 102 via any of the first MAG 112 and the second MAG 122 that may have an active interface with the MN 102.

The service provider network 140 may be any network that provides services to the MN 102 via the first wireless access network 110 and/or the second wireless access network 120. For instance, the service provider network 140 may be an Internet Service Provider (ISP), a network service provider (NSP), an application service provider (ASP), or combinations thereof. The services may be provided to the MN 102 in the form of upstream and/or downstream IP packets, such as IPv6 packets, and may comprise data, text, voice, video, and/or any other services. The packets may be part of an IPv6 flow that may be identified by a source IP address, a destination IP addresses, a transport protocol number, a source port number, a destination port number, or combinations thereof. The services may be directed between the service provider network 140 and the first wireless access network 110 and/or the second wireless access network 120 using the LMA 130.

In an embodiment, the MN 102 may access the first wireless access network 110, which may be a 3GPPP network, and establish a first interface with the network to receive a plurality of services via the LMA 130. The services may comprise a voice over IP (VoIP) call, an IP television (IPTV) program, a file or point-to-point (p2p) download, or combinations thereof. As such, each flow may be initially associated with the first wireless access network 110. Subsequently, the MN 102 may move within the range of the second wireless access network 120, which may be a WiFi network. The range of the second wireless access network 120 may overlap with the range of the first wireless access network 110. As such, the MN 102 may also remain within the range of the first wireless access network 110 and continue to receive at least some of the services via the first wireless access network 110.

In some cases, it may be desirable for the MN 102 to establish a second interface with the second wireless access network 120 to receive at least one of the services bound to the first wireless access network 110. For example, the IPTV program and/or the file download may be received via the second wireless network 120 with improved bandwidth and/or reduced cost, in comparison to the first wireless access network 110. Consequently, it may be desirable to redirect a service that may be initially delivered via the first wireless network 110 to the second wireless network 120. The services for the MN 102 may be bound or redirected from the first wireless access network 110 to the second wireless access network 120 using PBU and PBA messages between the first MAG 112, the LMA 130, and the second MAG 122, as described below.

Further, the MN 102 may move (e.g. after some time) out of the range of the second wireless access network 120, but may remain within the range of the first wireless access network 110. Alternatively, it may become undesirable to continue receiving the service via the second wireless access network 120, e.g. due to bandwidth constraints and/or congestion at the second wireless access network 120. Thus, the service may be redirected back to the first wireless access network 110 to allow the MN 102 to continue receiving the service. The service may be redirected back from the second wireless access network 120 to the first wireless access network 110 using PBU and PBA messages between the second MAG 122, the LMA 130, and the first MAG 112.

In an embodiment, flow binding may be initiated by a first MAG (e.g. MAG 112) in a first (access) network to a second (access) network to offload some traffic from the first network to the second network. Alternatively, flow binding may be triggered by an LMA (e.g. LMA 130) when a new active link or interface is detected between a mobile device (e.g. MN 102) and a second MAG (e.g. MAG 122) in the second network. Further, the flow offloaded from the first network to the second network may be redirected back from the second network to the first network when the bandwidth in the second network becomes congested. Alternatively, the second MAG may trigger flow binding to redirect traffic back to the first network when the device interface with the second network becomes inactive.

The first MAG (or second MAG) from which the flow may be redirected may be referred to herein as the SMAG and the second MAG (or first MAG) to which the flow may be redirected may be referred to herein as the TMAG. During flow binding, the SMAG and/or the TMAG may identify, e.g. using inner layer information, a flow as a raw flow that is established at the device interface within the same network and/or that does not require offloading to another network. Alternatively, the flow may be identified as an offloaded flow that requires binding to another network. For instance, the offloaded flow may be redirected using a bi-directional tunnel between the LMA and the TMAG.

When a MAG detects a new active interface for a mobile device within a network, the MAG may inform the LMA about the new interface using a PBU message. The PBU message may trigger the LMA to notify any other MAG, which may be connected to a different interface of the mobile device, about the new active interface. The LMA may advertise the availability of the new interface to all the existing MAGs that are linked to the mobile device via signaling. For instance, the LMA may send a generic signaling request to the MAGs. The generic signaling request may comprise an access technology type option, which may be set to indicate the presence of the new active interface.

When the LMA receives the PBU message that requests flow binding from a SMAG, the LMA may grant the request and allow flow binding based on a network operator policy, a MN's preference, the bandwidth of the flow, other criteria, or combinations thereof. The decision to offload the flow may be made by the MN and/or the LMA. In an embodiment, the MN may determine whether to offload some of its traffic, e.g. from an established interface in a first network to a new active interface in a second network, based on a local preference or criterion. For example, the MN may decide to offload some traffic to a new active interface that uses a preferred radio technology in terms of cost and/or data rate, due to a constraint or limit on the bandwidth of the established interface, to meet a Quality of Service (QoS) requirement, due to other criteria, or combinations thereof. Other criteria for deciding to offload traffic for the MN may include the service type of traffic, a partial failure in a link at the established interface, bandwidth redistribution, battery power saving, etc. Alternatively, the LMA may make the determination instead of the MN as to whether a second MAG (e.g. in another network) may receive the flow from the SMAG and accordingly grant the flow binding request. For example, the LMA may send a generic signaling request message to the second MAG and wait for acknowledgement from the second MAG to accept flow binding.

In mobile IPv6, the MN may handle its own mobility and may establish a plurality of interfaces with a plurality of networks. As such, each flow that corresponds to an interface may be identified using a flow identifier (FID) and a binding ID (BID), e.g. in the received flow or traffic. The BID may be generated and managed by the MN. However, in proxy mobile IPv6, the MN may not handle its own mobility management, but instead a plurality of MAGs may manage the mobility of the mobile device in a plurality of corresponding networks. Since the different MAGs may be aware of the different interfaces and flows of the MN in their corresponding networks, there may be no need to use the FID and BID to distinguish the different interfaces and flows. Thus, the FID and BID may be both set to about zero for each of the interfaces. However, a flow may be labeled with a serving IP (SIP) that may indicate a source node from which to redirect the flow and a target IP (TIP) that may indicate a target node to which to redirect the flow. The SIP and TIP may be included in the packets that correspond to the flow. The SMAG, LMA, and/or TMAG may exchange the SIP and TIP, e.g. using a signaling protocol.

When a flow binding request is accepted by a LMA or a TMAG, the LMA may receive the flow packets destined to the target node from a service provider network, encapsulate the packets, and send the packets, e.g. downstream, to the network (or interface) that corresponds to the TMAG. The packets may be encapsulated using an outer header, which may comprise a TIP that indicates the target node (e.g. mobile device) and a source address that indicates the LMA. Additionally, the LMA may send a message, such as an Internet control message protocol (ICMP) message, to the mobile device to notify the mobile device about redirecting the flow to the network (or interface) of the TMAG. Thus, the mobile device may transmit the flow packets, e.g. upstream, to the LMA via the network (or interface) of the TMAG.

In an embodiment, the target address of the packets may be an IP version four (IPv4) address and the ICMP message from the LMA may be an ICMP version four (ICMPv4) message, e.g. based on RFC 0792, which is incorporated herein by reference. The ICMPv4 message may comprise a Type field that may be set to about three to indicate to the target node that the message is a "Destination Unreachable Message." The ICMPv4 message may also comprise a Code field that may be set to about five to indicate that "a source route failed." Alternatively, the target address of the packets may be an IPv6 address and the ICMP message may be an ICMP version six (ICMPv6) message, e.g. based on RFC 4443, which is incorporated herein by reference. As such, the ICMPv6 message may comprise a Type field that may be set to about one to indicate that the message is a "Destination Unreachable Message." The ICMPv6 message may also comprise a Code field that may be set to about six for "reject route to destination."

In an embodiment, a plurality of different prefixes may be assigned to identify the different interfaces (e.g. in different networks) that may provide the flows for a mobile device. Additionally, each reset or reactivated interface may be reassigned the same IP address. For instance, when an interface becomes inactive, e.g. stop transporting a flow, the IP address may be mapped to a second interface or to a virtual interface to maintain the IP address session, e.g. until the interface is active again. Thus, when the interface becomes active again and is assigned the same prefix, e.g. from the LMA, the address is mapped back to the interface. In the case where a plurality of interfaces may share the same IP address, the LMA may not encapsulate the packets using an outer header that specifies a TIP.

Figure 2:
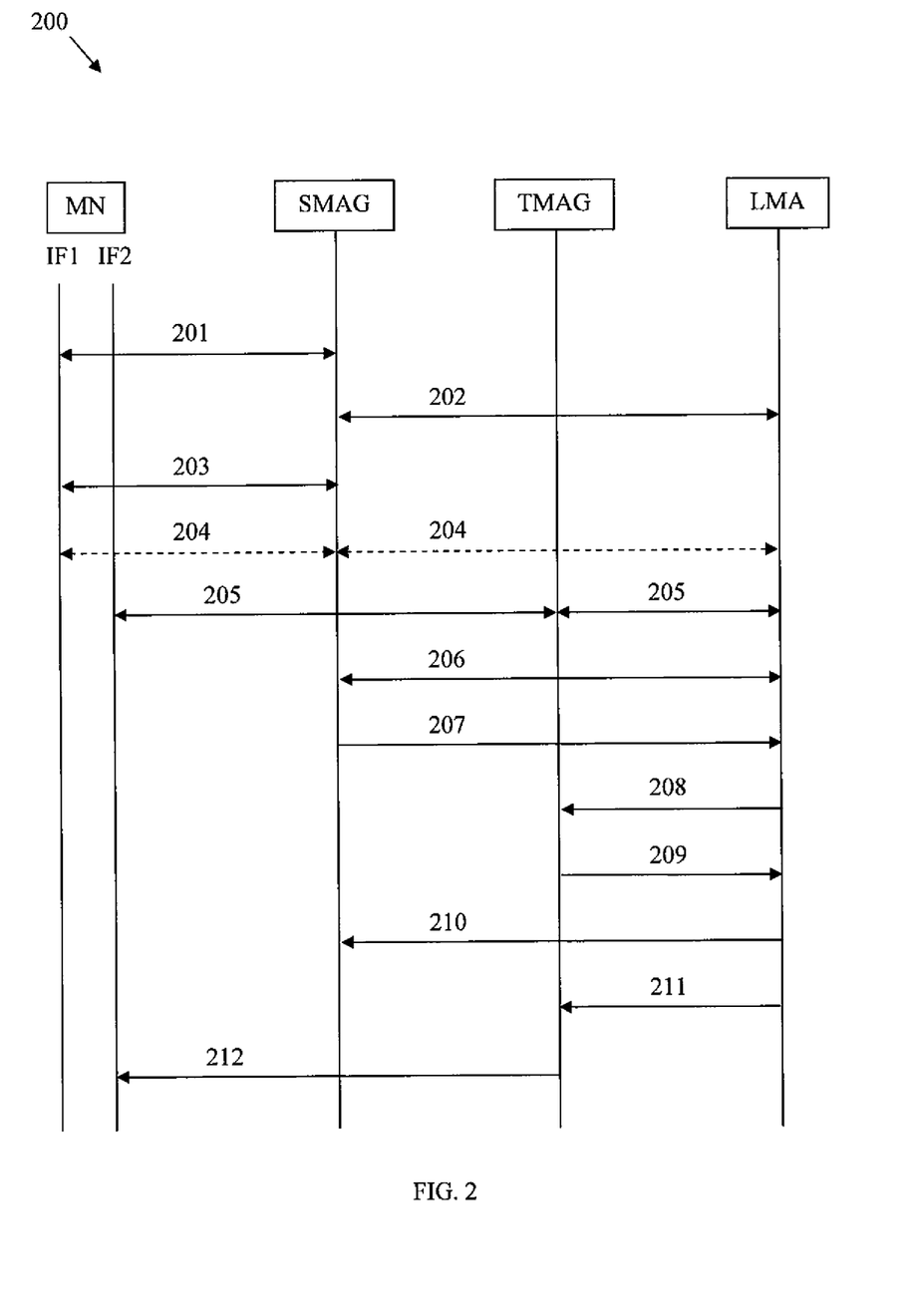
FIG. 2 is a protocol diagram of an embodiment of a flow binding method.

FIG. 2 illustrates one embodiment of a flow binding message method 200, which may be established to redirect a flow for a MN from a first interface in a first network to a second interface in a second network. Initially, the MN may activate the first interface in the first network. At step 201, the MN may establish a link or attachment between the first interface and a SMAG in the first network. At step 202, the SMAG may complete a PBU/PBA message exchange with a LMA, e.g. upon detecting the link with the MN. The LMA may be configured to connect the first network to a provider network.

The PBU message may comprise an access technology type option, which may be set to indicate the activated first interface or link. Upon receiving the PBU message, the LMA may assign a first prefix for the MN using the PBA message, which may be sent from the LMA to the SMAG. At step 203, the SMAG may obtain the assigned first prefix from the PBA message and advertise it to the MN. For instance, the SMAG may send the first prefix to the MN in a router advertisement message. Thus, the MN may receive the assigned first prefix and use the first prefix to configure its address, e.g. using stateless address configuration based on RFC 4862, which is incorporated herein by reference. As such, the address may be used in any flow exchange (e.g. VoIP, IPTV, or p2p download) for the MN via the first interface. Specifically, the address may be used as a SIP in the packets forwarded to the MN via the first interface. At step 204, the MN may receive at least one flow, e.g. for IPv6 service, from the LMA via the SMAG.

At step 205, the MN may activate the second interface in the second network, and hence establish a link or attachment between the second interface and a TMAG in the second network. The TMAG may then complete a PBU/PBA message exchange with the LMA, which may comprise an access technology type option that indicates the activated second interface or link to the LMA. The LMA may receive the PBU message and assign a second prefix for the MN in the PBA message to the TMAG. The TMAG may then advertise the second prefix to the MN, e.g. using a router advertisement message. Thus, the MN may receive the assigned prefix and use the prefix to configure a second address, which may be associated with the second interface. Specifically, the second address may be used as a TIP in the packets forwarded to the MN via the second interface. The TIP of the MN may be different than the SIP of the MN, e.g. based on RFC 5213.

At step 206, the LMA may notify the SMAG about the presence of the second interface in the second network. For instance, the LMA may exchange generic signaling request and generic signaling acknowledgement messages with the SMAG to notify the SMAG about the second active interface. The generic signaling request and generic signaling acknowledgement messages may be configured as described in the IETF document draft-ietf-mext-generic-signaling-message, which is incorporated herein by reference as if reproduced in its entirety. Accordingly, the generic signaling request may comprise an alternative interface indicator option that indicates information about the second interface, which may include the address of the TMAG in the second network. At step 207, the MN may decide to offload some traffic flow from the first interface to the second interface, e.g. based on the MN's profile, the operator policy, and/or other decision criteria. As such, the SMAG may send a PBU message to the LMA, which may comprise a flow identification option, e.g. as described in the IETF document draft-ietf-mext-flow-binding, which is incorporated herein by reference as if reproduced in its entirety. The PBU message may request that the LMA change the direction of the flow from the SMAG to the TMAG.

The LMA may receive the PBU message and decide to grant the offloading request for the MN, e.g. based on local information such as access technology types, bandwidth, service types, and/or other criteria. At step 208, the LMA may inquire to the TMAG whether the offloading is allowed. For instance, the LMA may send a generic signaling request message to the TMAG to inquire whether the offloading is allowed. The generic signaling request message may comprise a flow identification option. At step 209, the TMAG may send a reply to the LMA in which the TMAG accepts or rejects the flow binding request. The reply may be a generic signaling acknowledgement message, which may comprise a status field. The status field may be set to about zero if the TMAG accepts the request, or may be set to about 130 to indicate that the TMAG has insufficient resources and/or does not accept the flow binding request.

At step 210, the LMA may send a PBA message to the SMAG, e.g. upon receiving a reply from the TMAG to accept the flow binding. At step 211, the LMA may encapsulate the packets that correspond to the offloaded flow by adding an outer header to the packets. Before encapsulation, the packets may comprise the SIP as a destination address to the MN via the first interface and the first network. After encapsulation, the outer header added to the packets may indicate the TIP as a second destination to the MN via the second interface and second network. The packets may be encapsulated as described in RFC 5213 and thus forwarded via a bi-directional tunnel configured on the second interface to the TMAG. At step 212, the TMAG may receive the packets, which may comprise about two IP encapsulation layers. The TMAG may then strip the outer encapsulation layer, e.g. remove the outer header, and forward the packets to the MN via the second interface. The MN may receive the packets, strip the remaining IP encapsulation layer, and process the packets, which may comprise the SIP as the destination address.

Figure 3:
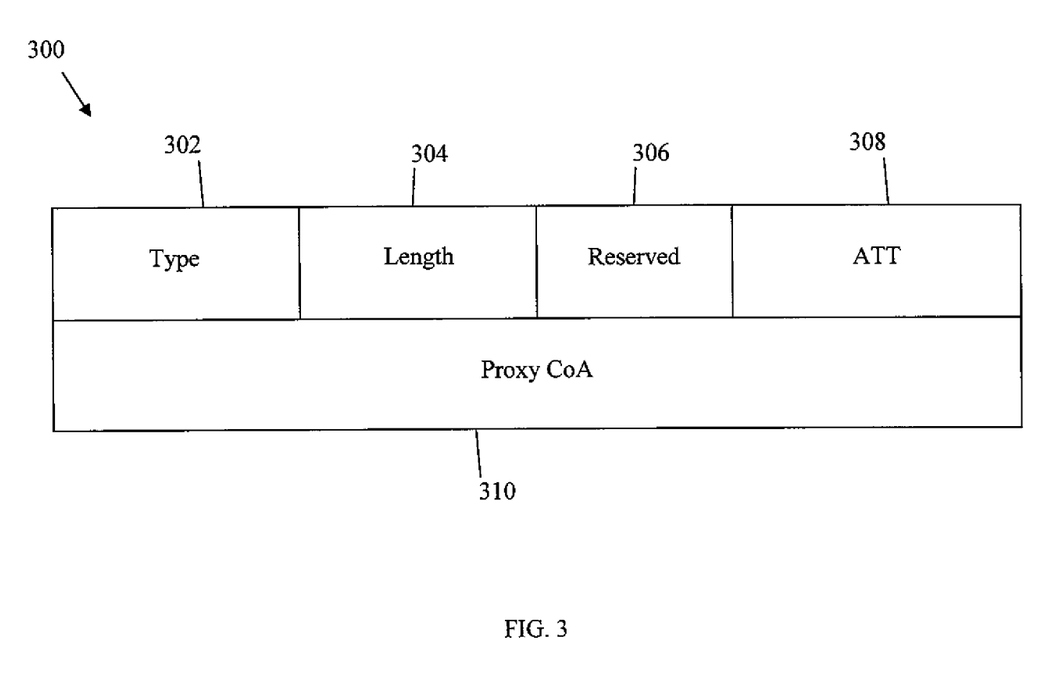
FIG. 3 is a schematic diagram of an embodiment of an alternative interface indicator option.

FIG. 3 illustrates an embodiment of an alternative interface indicator option 300, which may be used to advertise the availability of a new interface for a MN. The alternative interface indicator option 300 may indicate a second active interface for a MN, which may be used to offload a flow from a first interface of the MN. For example, the alternative interface indicator option 300 may be included in the generic signaling request and/or generic signaling acknowledgement messages between a LMA and a SMAG in a first network associated with the first interface of the MN. The alternative interface indicator option 300 may comprise a Type field 302, a Length field 304, a Reserved (R) field 306, an Access Technology Type (ATT) field 308, and a Proxy Care-of-Address (CoA) 310.

The Type field 302 may indicate that the option 300 is an alternative interface indicator option. For example, the Type field 302 may comprise a value that uniquely identifies the alternative interface indicator option and that is defined by the Internet Assigned Numbers Authority (IANA). The Length field 304 may indicate a size of the alternative interface indicator option, e.g. in octets, which may exclude the size of the Type filed 302 and the Length field 304. For instance, the Length field 304 may be set to about six if the Proxy CoA 310 is an IPv4 address, or may be set to about 18 if the Proxy CoA 310 is an IPv6 address. The R field 306 may be reserved for other purposes and may not be used. The R field may be initially set to about zero by the sender and hence ignored by the receiver. The ATT field 308 may specify an access technology of the link between the MN and the LMA, such as a 3GPP link or a WiFi link. For instance, the ATT field 308 may be configured as described in RFC 5213. The Proxy CoA 310 may comprise an address (e.g. IP address) of a MAG (e.g. SMAG) associated with the new interface and to which the flow packets may be redirected. In an embodiment, the size of each one of the Type field 302, the Length field 304, the R field 306, and the ATT field 308 may be equal to about eight bytes. The size of the Proxy CoA 310 may vary based on the size of the IP version address used.

The system and method above may enable a first MAG (e.g. SMAG) to offload traffic for a MN to a second MAG (TMAG), via a LMA. Thus, the first MAG may also be capable of launching Denial-of-Services (DoS) attacks to the second MAG, which may affect system security. However, since the LMA may be configured to decide whether to approve or accept any requests from the first MAG for off-loading traffic from the MN, the LMA may also be configured to address security concerns, such as mitigating DoS attacks on the system.

Figure 4:
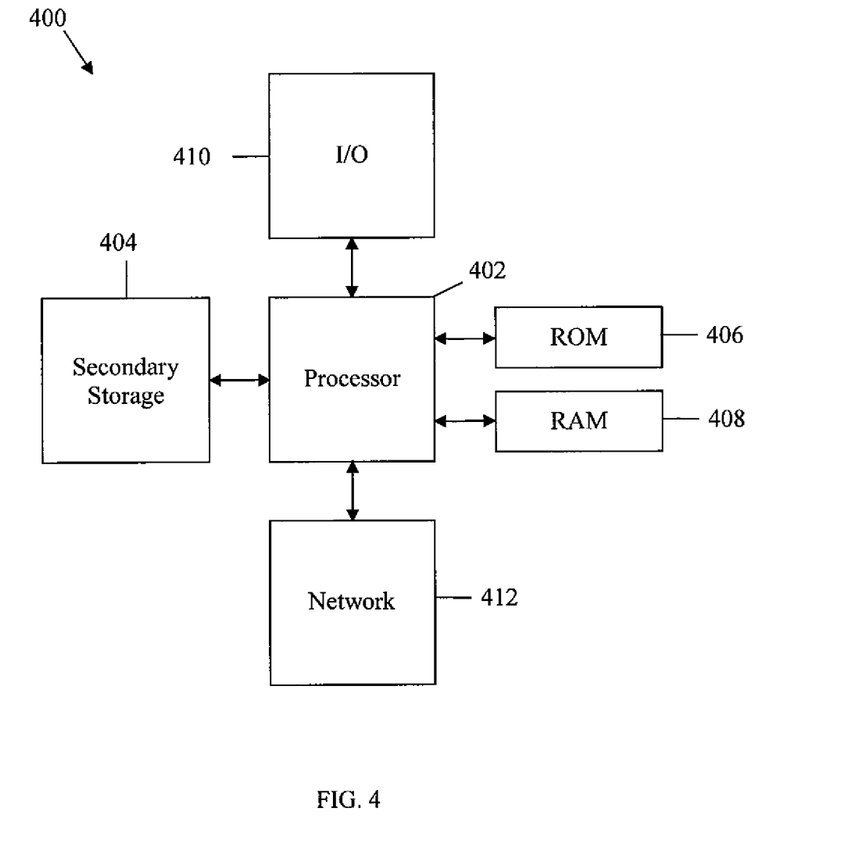
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (110) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a local mobility anchor (LMA) configured to:
  forward a first flow to a mobile node (MN) via a source mobile access gateway (MAG) that manages mobility of the MN in a source network;
  forward a second flow to the MN via a target MAG that manages mobility of the MN in a target network;
  receive a message from the target MAG that indicates an access technology type of the second flow;
  transmit a care-of-address (CoA) of the target MAG and the access technology type to the source MAG to support MN mobility management by the source MAG;
  receive a binding update from the source MAG indicating a decision by the source MAG to transfer the first flow to the target MAG based on the target MAG COA and the access technology type, wherein the binding update comprises information describing the first flow and requesting initiation of the transfer of the first flow to the target MAG on behalf of the MN;
  bind the first flow to the target MAG from the source MAG; and
  reply to the binding update with a binding acknowledgement.

2. The apparatus of claim 1, wherein the first flow is forwarded toward the MN via the source MAG and a first active interface in the MN.

3. The apparatus of claim 2, wherein the first active interface is a third Generation Partnership Project (3GPP) network interface.

4. The apparatus of claim 3, wherein the second flow is forwarded to the MN via the target MAG and a second active interface in the MN.

5. The apparatus of claim 4, wherein the second active interface is an Institute of Electrical and Electronics Engineers (IEEE) 802.11 Wireless Local Area Network (WLAN) interface.

6. The apparatus of claim 1, wherein the LMA is further configured to forward the first flow to the MN via a bi-directional tunnel between the LMA and a second MAG in response to binding the first flow to the target MAG.

7. The apparatus of claim 1, wherein the first flow is an Internet Protocol (IP) version six (IPv6) flow identified by a source IP address, a destination IP address, a transport protocol number, a source port number, and a destination port number.

8. The apparatus of claim 7, wherein the first flow comprises a voice over IP (VoIP) call, an IP television (IPTV) program, a file or point-to-point (p2p) download, or combinations thereof.

9. The apparatus of claim 1, wherein initiating the flow transfer is not requested by the MN.

10. A network component comprising:
    a local mobility anchor (LMA) configured to communicate with a target mobile access gateway (MAG), communicate with a source MAG, and initiate a flow transfer from the source MAG to the target MAG on behalf of a mobile node (MN),
    wherein initiating the flow transfer from the source MAG to the target MAG comprises:
        detecting a new attachment between the MN and the target MAG, wherein the new attachment is characterized by exchanging a first proxy binding update (PBU) message and a proxy binding acknowledgement (PBA) message with the target MAG, and wherein the first PBU message indicates an access technology type of the new attachment;
        notifying the source MAG of the new attachment between the MN and the target MAG, wherein the source MAG has a previously established attachment with the MN, and wherein notifying the source MAG of the new attachment between the MN and the target MAG comprises notifying the source MAG of the access technology type associated with the attachment between the MN and the target MAG;
        receiving a second PBU message from the source MAG indicating a decision by the source MAG to transfer the flow to the target MAG based on the target MAG access technology type; and
        binding the flow to the new attachment from the previously established attachment.

11. The network component of claim 10, wherein the PBA message advertises a prefix to the MN for configuring an address for the MN associated with the new attachment and not the previously established attachment, and wherein the flow is forwarded to the MN over the new attachment by employing the MN address.

12. The network component of claim 11, wherein the previously established attachment is configured by exchanging a third PBU message and a second PBA message with the source MAG, wherein the second PBA message advertises a second prefix to the MN for configuring a second address for the MN associated with the previously established attachment and not the new attachment, and wherein, prior to the flow binding, the flow is directed forwarded to the MN over the previously established attachment by employing the second address.

13. The network component of claim 12, wherein the third PBU message indicates a second access technology type of the previously established attachment.

14. The network component of claim 10, wherein the MN is not involved in deciding to bind the flow to the new attachment.

15. The network component of claim 9, wherein the flow is an Internet Protocol (IP) version six (IPv6) flow identified by a source IP address, a destination IP address, a transport protocol number, a source port number, and a destination port number.

16. The network component of claim 10, wherein initiating the flow transfer is not requested by the MN.

17. A method implemented in a local mobility anchor (LMA) comprising:
    receiving a binding update for an Internet Protocol (IP) flow that is forwarded to a mobile node (MN) over a source interface associated with a source mobile access gateway (MAG) in a first access network, wherein the IP flow comprises a plurality of packets that are associated with a first address associated with the source MAG, wherein the first address is used to deliver the packets to the MN via the source MAG, and wherein the binding update indicates an access technology type of the source interface;
    transmitting a care-of-address (CoA) of a target MAG in a second access network to the source MAG to support source MAG management of mobility of the MN;
    receiving a second binding update from the source MAG indicating a decision by the source MAG to redirect the IP flow to the MN via the target MAG COA, wherein redirecting the IP flow is not requested by the MN; and
    redirecting the IP flow to the target interface associated with the target MAG in the second access network,
    wherein redirecting the IP flow comprises encapsulating the packets with an outer header that comprises a second address associated with the target MAG, and
    wherein the second address is used to deliver the IP flow packets to the MN via the target MAG.

18. The method of claim 17, wherein the source interface is a third Generation Partnership Project (3GPP) network interface, and wherein the target interface is an Institute of Electrical and Electronics Engineers (IEEE) 802.11 Wireless Local Area Network (WLAN) interface.

19. The method of claim 18, wherein the IP flow is an IP version six (IPv6) flow identified by a source IP address, a destination IP address, a transport protocol number, a source port number, and a destination port number.

* * * * *

UNITED STATES PATENT AND TRADEMARK OFFICE
CERTIFICATE OF CORRECTION

PATENT NO. : 8,908,662 B2  
APPLICATION NO. : 12/702087  
DATED : December 9, 2014  
INVENTOR(S) : Yangsong Xia et al.

Page 1 of 1

It is certified that error appears in the above-identified patent and that said Letters Patent is hereby corrected as shown below:

In the Claims:

Column 11, Line 58 through Column 12, Line 8, Claim 12, should read as:

-- 12. The network component of claim 10, wherein the previously established attachment is configured by exchanging a third PBU message and a second PBA message with the source MAG, wherein the second PBA message advertises a second prefix to the MN for configuring a second address for the MN associated with the previously established attachment and not the new attachment, and wherein, prior to the flow binding, the flow is forwarded to the MN over the previously established attachment by employing the second address. --

Column 12, Lines 16-20, Claim 15, should read as:

-- 15. The network component of claim 10, wherein the flow is an Internet Protocol (IP) version six (IPv6) flow identified by a source IP address, a destination IP address, a transport protocol number, a source port number, and a destination port number. --

Signed and Sealed this  
Twelfth Day of May, 2015

Michelle K. Lee  
*Director of the United States Patent and Trademark Office*